(12) United States Patent
Ho et al.

(10) Patent No.: US 9,079,272 B2
(45) Date of Patent: Jul. 14, 2015

(54) SOLDER JOINT WITH A MULTILAYER INTERMETALLIC COMPOUND STRUCTURE

(71) Applicant: Yuan Ze University, Taoyuan County (TW)

(72) Inventors: Cheng-En Ho, New Taipei (TW); Shih-Ju Wang, New Taipei (TW); Yu-Hui Wu, Taoyuan County (TW)

(73) Assignee: Yuan Ze University, Taoyuan County (TW)

( * ) Notice: Subject to any disclaimer, the term of this patent is extended or adjusted under 35 U.S.C. 154(b) by 90 days.

(21) Appl. No.: 13/778,160

(22) Filed: Feb. 27, 2013

(65) Prior Publication Data

US 2014/0126955 A1    May 8, 2014

(30) Foreign Application Priority Data

Nov. 2, 2012   (TW) .............................. 101140753 A

(51) Int. Cl.
*B23K 35/26* (2006.01)
*B23K 35/24* (2006.01)
*B23K 35/30* (2006.01)

(52) U.S. Cl.
CPC .............. *B23K 35/24* (2013.01); *B23K 35/262* (2013.01); *B23K 35/302* (2013.01); *Y10T 403/479* (2015.01)

(58) Field of Classification Search
None
See application file for complete search history.

(56) References Cited

U.S. PATENT DOCUMENTS

| 4,758,407 | A * | 7/1988 | Ballentine et al. ............. 420/560 |
| 6,630,251 | B1 * | 10/2003 | Carter et al. .................. 428/646 |
| 8,013,428 | B2 * | 9/2011 | Hooghan et al. .............. 257/666 |
| 8,101,285 | B2 * | 1/2012 | Mitose et al. ................. 428/607 |
| 2005/0161829 | A1 * | 7/2005 | Zeng ............................. 257/772 |
| 2005/0224327 | A1 * | 10/2005 | Agnatovech et al. ......... 200/314 |

FOREIGN PATENT DOCUMENTS

TW    405195    9/2000
TW    I359714   3/2012

OTHER PUBLICATIONS

Ho et al., "Reliability evaluation on a submicron Ni(P) thin film for lead-free soldering", Thin Solid Films, Feb. 2013 , vol. 529, p. 364-p. 368.

(Continued)

*Primary Examiner* — Adam Krupicka
(74) *Attorney, Agent, or Firm* — Jianq Chyun IP Office

(57) ABSTRACT

A solder joint with a multilayer IMC structure is provided. The solder joint includes a Cu pad, a Sn-based solder, a first, a second, and a third IMC layer. The Cu pad is disposed opposite to the Sn-based solder. The first IMC layer is disposed between the Cu pad and the Sn-based solder. The first IMC layer is a $Cu_3Sn$ layer. The second IMC layer is disposed between the first IMC layer and the Sn-based solder. The second IMC layer is a $(Cu_{1-x1-y1}Ni_{x1}Pd_{y1})_6Sn_5$ layer, wherein x1 is in the range between 0 and 0.15, and y1 is in the range between 0 and 0.02. The third IMC layer is disposed between the second IMC layer and the Sn-based solder. The third IMC layer is a $(Cu_{1-x2-y2}Ni_{x2}Pd_{y2})_6Sn_5$ layer, wherein x2 is in the range between 0 and 0.4, y2 is in the range between 0 and 0.02, and x2>x1.

10 Claims, 4 Drawing Sheets

(56) References Cited

OTHER PUBLICATIONS

Shao-Cheng Lo, "Interfacial Reactions and Mechanism Properties between SAC405 and SACNG Lead-free Solders with Au/Ni(P)/Cu Substrates Reflowed by CO2 laser," Master Thesis, Graduate School of Materials Science and Technology, National Taiwan University of Science and Technology, Jul. 2009.

"Office Action of Taiwan Counterpart Application," issued on Mar. 6, 2015, p. 1-p. 3.

* cited by examiner

SOLDER JOINT WITH A MULTILAYER INTERMETALLIC COMPOUND STRUCTURE

CROSS-REFERENCE TO RELATED APPLICATION

This application claims the priority benefit of Taiwan application serial no. 101140753, filed on Nov. 2, 2012. The entirety of the above-mentioned patent application is hereby incorporated by reference herein and made a part of this specification.

BACKGROUND OF THE INVENTION

1. Field of the Invention

The invention relates to a solder joint, and more particularly, to a solder joint with a multilayer intermetallic compound structure between the solder and the Cu pad.

2. Description of Related Art

Soldering is a metallization process to electrically/mechanically join two separate metals with a solder that possesses a relatively low melting point to that of the joined metals. Solders utilized in electronic packaging are mostly the tin (Sn)-based alloy, such as Sn—Pb alloy, Sn—Zn alloy, Sn—Bi alloy, Sn—In alloy, Sn—Sb alloy, Sn—Cu alloy, Sn—Ag alloy, Sn—Ag—Cu alloy, and Sn—Ag—Bi alloy. A common solderable metal (alternatively termed metallization pad) might contain Cu, Co, Ni, P, V, Pd, Pt, Au, Ag, Fe, Zn, or a composite structure thereof.

In general, microelectronic solder joints are fabricated via a wave/reflow soldering process, where a liquid-solid reaction between the Sn-based solder and the metallization pad occurs and an intermetallic compound(s) (IMC) is therefore produced at the solder/pad interface. The Intermetallic compound(s) formation at the interface is a good indication of metallurgical bonding and wetting; however, a thick intermetallic compound layer present at the joint interface is very detrimental to the mechanical reliability of solder joints because intermetallic compounds are all brittle in nature. Additionally, the microstructure and the type of the intermetallic compound might also play a dominant role in the mechanical properties of solder joints. Therefore, modification of the interfacial microstructure to enhance the mechanical characteristics of solder joints is an important reliability issue in the microelectronic packaging.

SUMMARY OF THE INVENTION

The invention provides a solder joint with a multilayer IMC structure, wherein the multilayer IMC structure formed at the interface of a solder and a pad.

The invention provides a solder joint with a multilayer IMC structure. The solder joint includes a Cu pad, a Sn-based solder, a first, a second, and a third IMC layer. The Cu pad is disposed opposite to the Sn-based solder. The first IMC layer is disposed between the Cu pad and the Sn-based solder. The first IMC layer is a $Cu_3Sn$ layer. The second IMC layer is disposed between the first IMC layer and the Sn-based solder. The second IMC layer is a $(Cu_{1-x1-y1}Ni_{x1}Pd_{y1})_6Sn_5$ layer, wherein x1 is in the range between 0 and 0.15, and y1 is in the range between 0 and 0.02. The third IMC layer is disposed between the second IMC layer and the Sn-based solder. The third IMC layer is a $(Cu_{1-x2-y2}Ni_{x2}Pd_{y2})_6Sn_5$ layer, wherein x2 is in the range between 0 and 0.4, y2 is in the range between 0 and 0.02, and x2>x1.

According to the solder joint with a multilayer IMC structure in an embodiment of the invention, the thickness of the first IMC layer is, for instance, in the range between 0.01 μm and 2 μm.

According to the solder joint with a multilayer IMC structure in an embodiment of the invention, the thickness of the second IMC layer is, for instance, in the range between 0.5 μm and 5 μm.

According to the solder joint with a multilayer IMC structure in an embodiment of the invention, the thickness of the third IMC layer is, for instance, in the range between 1 μm and 3 μm.

According to the solder joint with a multilayer IMC structure in an embodiment of the invention, a mixed IMC layer disposed between the second IMC layer, i.e., $(Cu_{1-x1-y1}Ni_{x1}Pd_{y1})_6Sn_5$, and the third IMC layer, i.e., $(Cu_{1-x2-y2}Ni_{x2}Pd_{y2})_6Sn_5$, is further included, and the mixed IMC layer is consisted of $Ni_2SnP$ and $Ni_3P$.

According to the solder joint with a multilayer IMC structure in an embodiment of the invention, the thickness of the mixed IMC layer is, for instance, in the range between 0.01 μm and 1 μm.

According to the solder joint with a multilayer IMC structure in an embodiment of the invention, the Sn-based solder further contains Cu.

According to the solder joint with a multilayer IMC structure in an embodiment of the invention, the Cu content in the Sn-based solder does not exceed, for instance, 3 wt. % of the total weight of the Sn-based solder.

According to the solder joint with a multilayer IMC structure in an embodiment of the invention, the Sn-based solder further contains Ag.

According to the solder joint with a multilayer IMC structure in an embodiment of the invention, the Ag content in the Sn-based solder does not exceed, for instance, 5 wt. % of the total weight of the Sn-based solder.

According to the solder joint with a multilayer IMC structure in an embodiment of the invention, the second IMC layer, i.e., $(Cu_{1-x1-y1}Ni_{x1}Pd_{y1})_6Sn_5$, further contains Au, and the Au content in the second IMC layer does not exceed, for instance, 1 wt. % of the total weight of the second IMC layer.

According to the solder joint with a multilayer IMC structure in an embodiment of the invention, the second IMC layer further contains Ag, and the Ag content in the second IMC layer does not exceed, for instance, 3 wt. % of the total weight of the second IMC layer.

According to the solder joint with a multilayer IMC structure in an embodiment of the invention, the second IMC layer further contains P, and the P content in the second IMC layer does not exceed, for instance, 1 wt. % of the total weight of the second IMC layer.

According to the solder joint with a multilayer IMC structure in an embodiment of the invention, the third IMC layer, i.e., $(Cu_{1-x2-y2}Ni_{x2}Pd_{y2})_6Sn_5$, further contains Au, and the Au content in the third IMC layer does not exceed, for instance, 1 wt. % of the total weight of the third IMC layer.

According to the solder joint with a multilayer IMC structure in an embodiment of the invention, the third IMC layer further contains Ag, and the Ag content in the third IMC layer does not exceed, for instance, 3 wt. % of the total weight of the third IMC layer.

According to the solder joint with a multilayer IMC structure in an embodiment of the invention, the third IMC layer further contains P, and the P content in the third IMC layer does not exceed, for instance, 1 wt. % of the total weight of the third IMC layer.

Based on the above, the solder joint of the invention has a multilayer IMC structure. The solder joint meets the requirements of the practical application, and the fabrication method is compatible with the current solder joint fabrication process.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
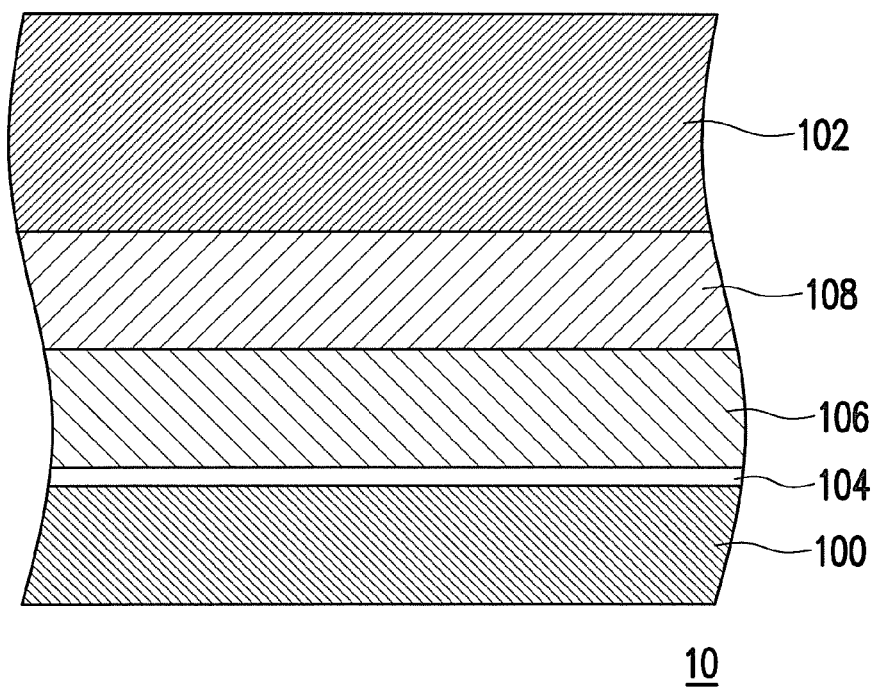
FIG. 1 illustrates a cross-sectional diagram of a solder joint according to the first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a cross-sectional diagram of a solder joint according to the first embodiment of the invention. Referring to FIG. 1, the solder joint 10 includes the Cu pad 100, the Sn-based solder 102, the first IMC layer 104, the second IMC layer 106, and the third IMC layer 108. The material of the Cu pad 100 is, for instance, Cu or Cu—Ni alloy. The Cu pad 100 is disposed opposite to the Sn-based solder 102. The material of the Sn-based solder 102 is, for instance, Sn, Sn—Bi alloy, Sn—Pb alloy, Sn—Cu alloy, Sn—Ag alloy, Sn—Ag—Cu alloy, or a combination thereof. In the embodiment, the Sn-based solder 102 is, for instance, Sn—Ag—Cu alloy, and the Cu content does not exceed, for instance, 3 wt. % of the total weight of the Sn-based solder, and the Ag content does not exceed, for instance, 5 wt. % of the total weight of the Sn-based solder. The Cu content is, for instance, greater than or equal to 0.3 wt. %, and does not exceed 3 wt. %. The Ag content is, for instance, greater than or equal to 0.01 wt. %, and does not exceed 5 wt. %.

The first IMC layer 104 is disposed between the Cu pad 100 and the Sn-based solder 102. The first IMC layer 104 is a $Cu_3Sn$ layer. The thickness of the first IMC layer 104 is, for instance, in the range between 0.01 μm and 2 μm. The second IMC layer 106 is disposed between the first IMC layer 104 and the Sn-based solder 102. The second IMC layer 106 is a $(Cu_{1-x1-y1}Ni_{x1}Pd_{y1})_6Sn_5$ layer, wherein x1 is in the range between 0 and 0.15, and y1 is in the range between 0 and 0.02. The thickness of the second IMC layer 106 is, for instance, in the range between 0.5 μm and 5 μm. The third IMC layer 108 is disposed between the second IMC layer 106 and the Sn-based solder 102. The third IMC layer 108 is a $(Cu_{1-x2-y2}Ni_{x2}Pd_{y2})_6Sn_5$ layer, wherein x2 is in the range between 0 and 0.4, and y2 is in the range between 0 and 0.02. Moreover, x2>x1, i.e. the Ni content of the third IMC layer 108 is greater than that of the second IMC layer 106. The thickness of the third IMC layer 108 is, for instance, in the range between 1 μm and 3 μm.

Moreover, in other embodiments, the second IMC layer 106 and the third IMC layer 108 may additionally possess trace amounts of Au, Ag, and P, respectively. For instance, the Au content does not exceed 1 wt. %, the Ag content does not exceed 3 wt. %, and the P content does not exceed 1 wt. % of the either total weight of the second IMC layer 106 or the third IMC layer 108.

The fabrication of the solder joint 10 of the embodiment is compatible with the current fabrication of solder joints, as explained in the following.

Experiment Example 1 Fabrication of the Solder Joint 10

Figure 2:
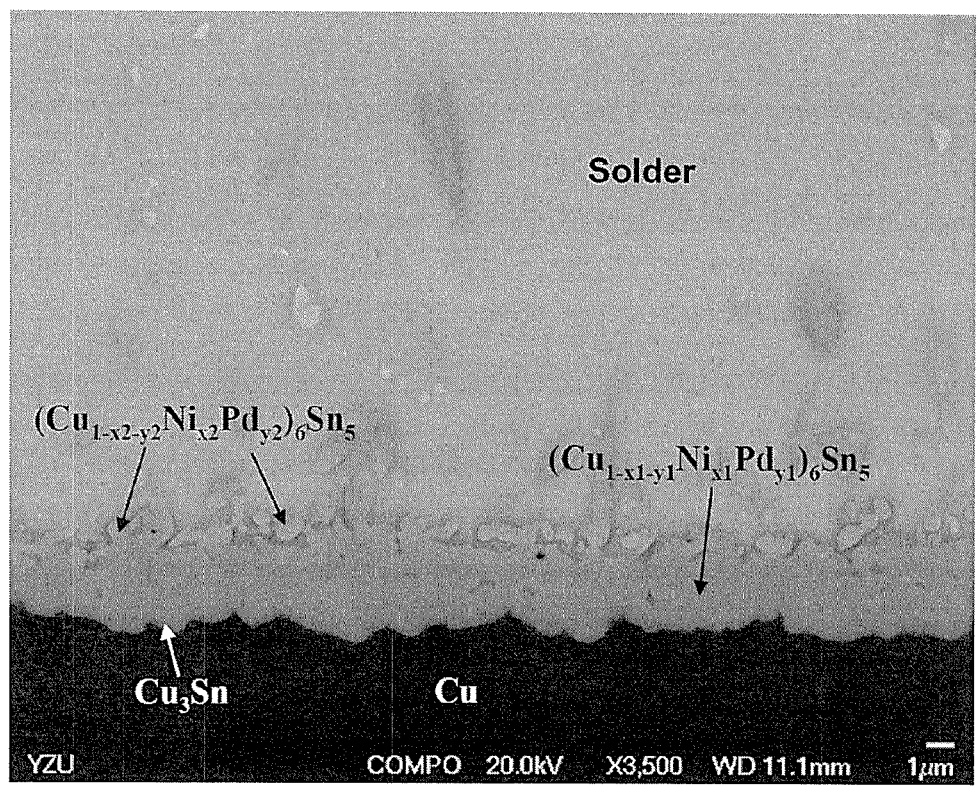
FIG. 2 is a cross-sectional diagram of an actual solder joint of the first embodiment acquiring from a scanning electron microscope.

First, a surface finish is treated over the Cu pad 100. The surface finish is a Ni layer (or a Ni—P layer), and the thickness of the surface finish is less than or equal to 0.2 μm. Subsequently, the Sn-based solder 102 is disposed on the surface finish. Then, a typical reflow soldering process is performed such that the Sn-based solder 102 is joined to the Cu pad 100. The peak temperature of the reflow soldering process is in the range between 250° C. and 260° C., and the reflow time (i.e., the time period for the solder in the liquid state) is in the range between about 60 seconds and 180 seconds. After reflow, the solder joint 10 with five layers (including three IMC layers) is obtained. The actual metallurgical microstructure of the interface of the solder joint 10 is shown in FIG. 2.

In experiment example 1, the thickness of the Ni layer (or the Ni—P layer) is less than or equal to 0.2 μm; therefore, the solder joint 10 with three IMC layers at the solder/pad interface is formed. However, the invention is not limited thereto. In other embodiments, another solder joint with a multilayer IMC structure may be obtained by adjusting the thickness of the Ni layer (or the Ni—P layer).

Figure 3:
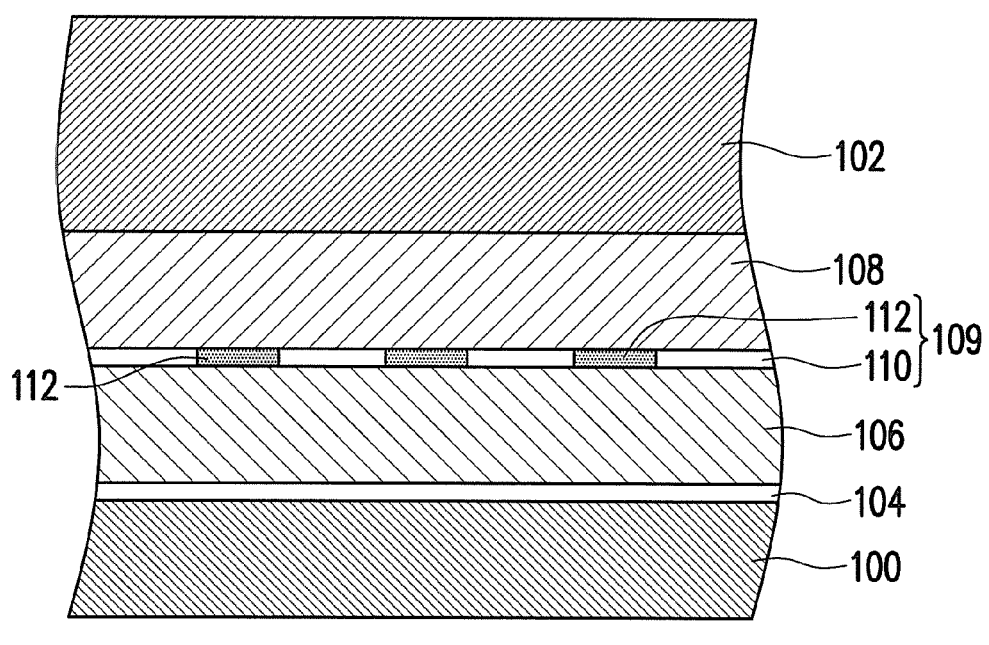
FIG. 3 illustrates a cross-sectional diagram of a solder joint according to the second embodiment of the invention.

FIG. 3 illustrates a cross-sectional diagram of a solder joint according to the second embodiment of the invention. In the embodiment, the same devices from FIG. 1 have the same reference numerals, and are not otherwise specified. In the embodiment, the difference between the solder joint 20 and the solder joint 10 is that in the solder joint 20, the mixed IMC layer 109 is disposed between the second IMC layer 106 and the third IMC layer 108. The mixed IMC layer 109 is consisted of $Ni_2SnP$ 110 and $Ni_3P$ 112. The thickness of the mixed IMC layer 109 is in the range between 0.01 μm and 1 μm.

The fabrication of the solder joint 20 of the embodiment is compatible with the current fabrication of solder joints, as explained in the following.

Experiment Example 2 Fabrication of the Solder Joint 20

Figure 4:
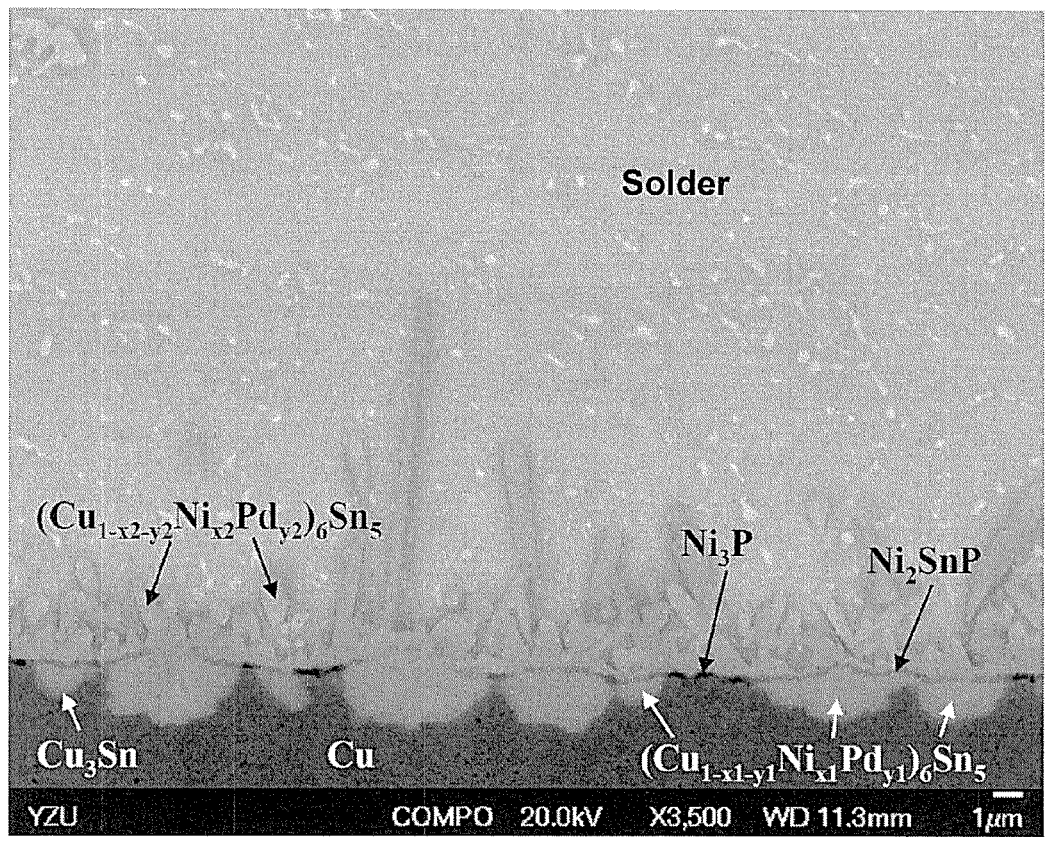
FIG. 4 is a cross-sectional diagram of an actual solder joint of the second embodiment acquiring from a scanning electron microscope.

First, a surface finish is formed on the Cu pad 100. The surface finish is a Ni layer (or a Ni—P layer), and the thickness of the surface finish is in the range between 0.2 μm and 1 μm. Subsequently, the Sn-based solder 102 is disposed on the surface finish. Then, a typical reflow soldering process is performed such that the Sn-based solder 102 is joined to the Cu pad 100. The peak temperature of the reflow soldering process is in the range between 250° C. and 260° C., and the reflow time (i.e., the time period for the solder in the liquid state) is in the range between about 60 seconds and 120 seconds. After reflow, the solder joint 20 with six layers (including four IMC layers) is obtained. The actual metallurgical microstructure of the interface of the solder joint 20 is shown in FIG. 4.

It may be obtained from experiment example 1 and experiment example 2 that solder joints with different multilayer IMC structures may be yielded by adjusting the thickness of the surface finish (the Ni layer or the Ni—P layer). When the thickness of the surface finish is less than or equal to 0.2 μm, the mixed IMC layer, i.e., $Ni_2SnP$ and $Ni_3P$, is not formed after a typical reflow soldering process. When the thickness of the surface finish is in the range between 0.2 μm and 1 μm (not including 0.2 μm), the mixed IMC layer ($Ni_2SnP$ and $Ni_3P$) is formed after a typical reflow soldering process. Both solder joints with a multilayer intermetallic compound structure satisfy the fundamental demands of the practical application.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A solder joint with a multilayer intermetallic compound (IMC) structure, comprising:
   a Cu pad;
   a Sn-based solder, containing Cu and Ag and disposed opposite to the Cu pad, wherein the Cu content in the Sn-based solder is equal to 0.3 wt. % of the total weight of the Sn-based solder, and the Ag content in the Sn-based solder is equal to 5 wt. % of the total weight of the Sn-based solder;
   a first IMC layer, disposed between the Cu pad and the Sn-based solder, with the first IMC layer being a $Cu_3Sn$ layer;
   a second IMC layer, disposed between the first IMC layer and the Sn-based solder, with the second IMC layer being a $(Cu_{1-x1-y1}Ni_{x1}Pd_{y1})_6Sn_5$ layer, wherein x1 is in the range between 0 and 0.15, and y1 is in the range between 0 and 0.02, and wherein the second IMC layer further comprises Ag, and the Ag content in the second IMC layer is up to 3 wt. % of the total weight of the second IMC layer; and
   a third IMC layer, disposed between the second IMC layer and the Sn-based solder, and the third IMC layer is a $(Cu_{1-x2-y2}Ni_{x2}Pd_{y2})_6Sn_5$ layer, wherein x2 is in the range between 0 and 0.4, y2 is in the range between 0 and 0.02, and x2>x1, and wherein the third IMC layer further comprises Ag, and the Ag content in the third IMC layer is up to 3 wt. % of the total weight of the third IMC layer.

2. The solder joint with a multilayer IMC structure of claim 1, wherein the thickness of the first IMC layer is in the range between 0.01 μm and 2 μm.

3. The solder joint with a multilayer IMC structure of claim 1, wherein the thickness of the second IMC layer is in the range between 0.5 μm and 5 μm.

4. The solder joint with a multilayer IMC structure of claim 1, wherein the thickness of the third IMC layer is in the range between 1 μm and 3 μm.

5. The solder joint with a multilayer IMC structure of claim 1, further comprising a mixed IMC layer, disposed between the second IMC layer and the third IMC layer and being consisted of $Ni_2SnP$ and $Ni_3P$.

6. The solder joint with a multilayer IMC structure of claim 5, wherein the thickness of the mixed IMC layer is in the range between 0.01 μm and 1 μm.

7. The solder joint with a multilayer IMC structure of claim 1, wherein the second IMC layer further comprises Au, and the Au content does not exceed 1 wt. % of the total weight of the second IMC layer.

8. The solder joint with a multilayer IMC structure of claim 1, wherein the second IMC layer further comprises P, and the P content does not exceed 1 wt. % of the total weight of the second IMC layer.

9. The solder joint with a multilayer IMC structure of claim 1, wherein the third IMC layer further comprises Au, and the Au content does not exceed 1 wt. % of the total weight of the third IMC layer.

10. The solder joint with a multilayer IMC structure of claim 1, wherein the third IMC layer further comprises P, and the P content does not exceed 1 wt. % of the total weight of the third IMC layer.

* * * * *